Feb. 29, 1944.                C. G. SWEBILIUS                2,342,824
                        SELF-LOADING REPEATING FIREARM
                          Filed Oct. 15, 1940            5 Sheets-Sheet 1
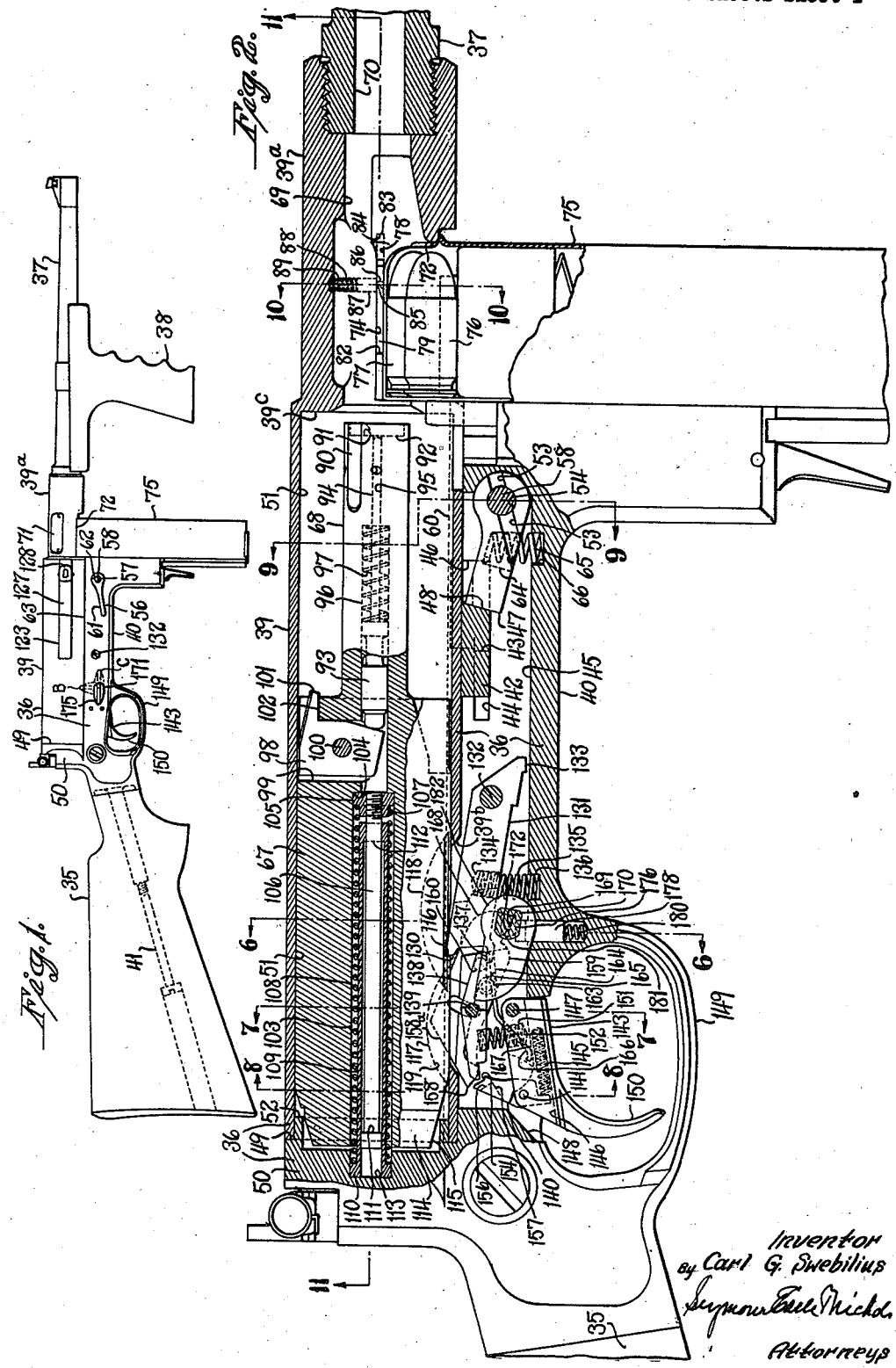
Inventor
by Carl G. Swebilius
Attorneys

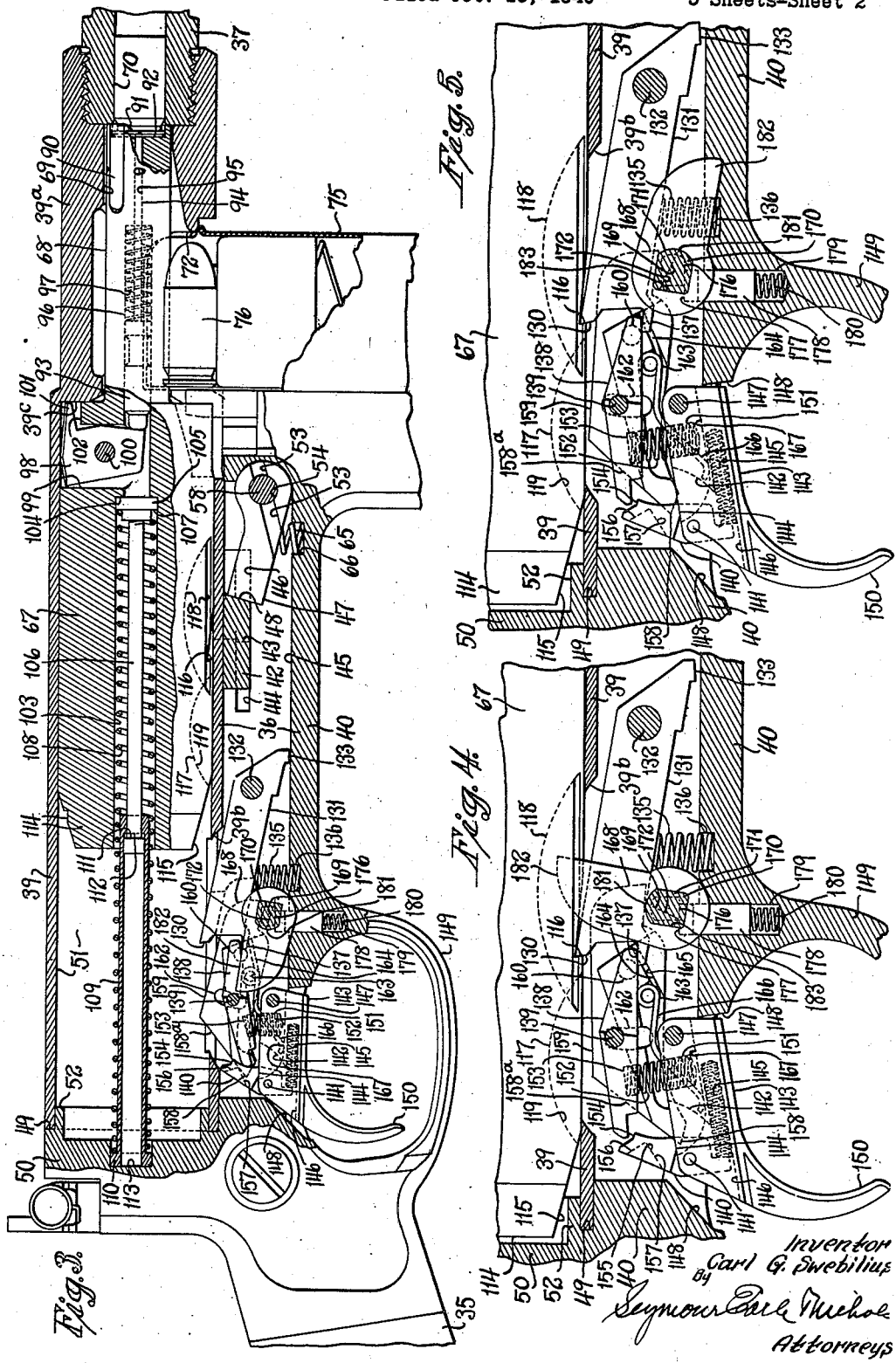

Feb. 29, 1944.   C. G. SWEBILIUS   2,342,824
SELF-LOADING REPEATING FIREARM
Filed Oct. 15, 1940   5 Sheets-Sheet 3
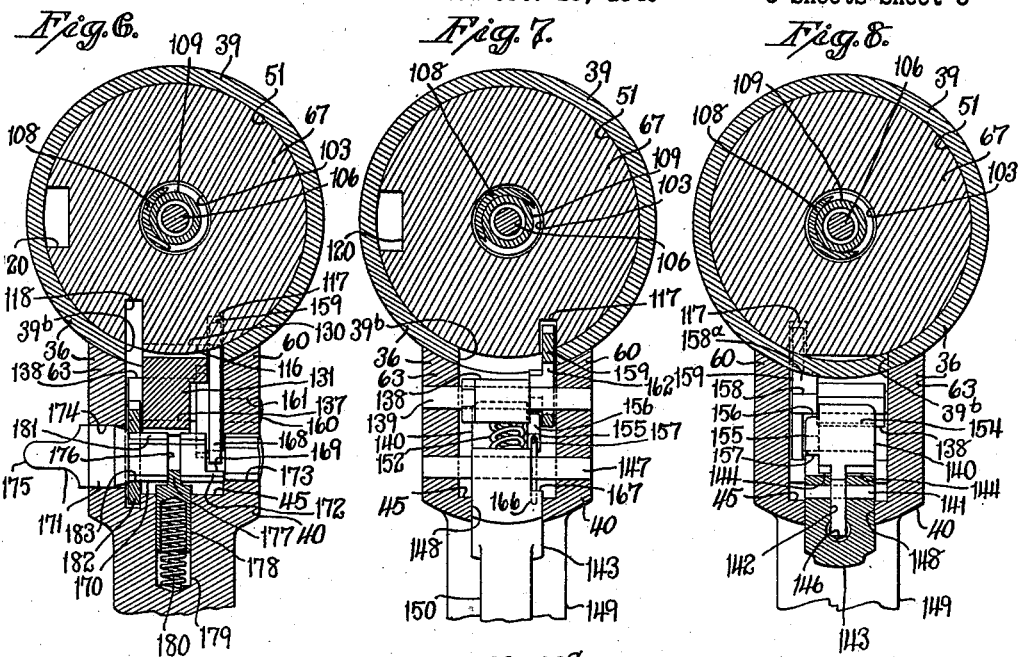
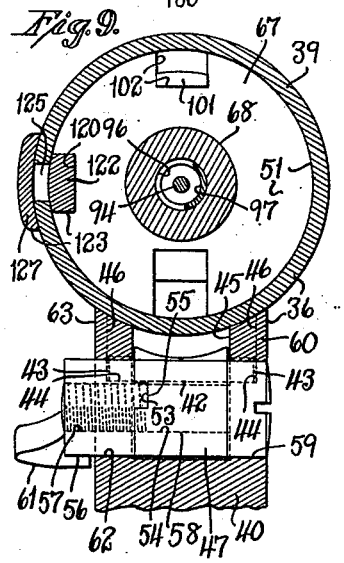
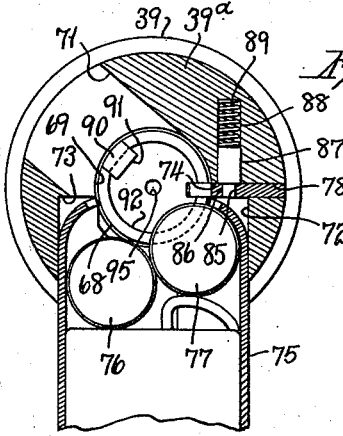
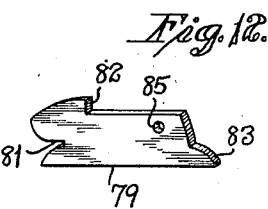
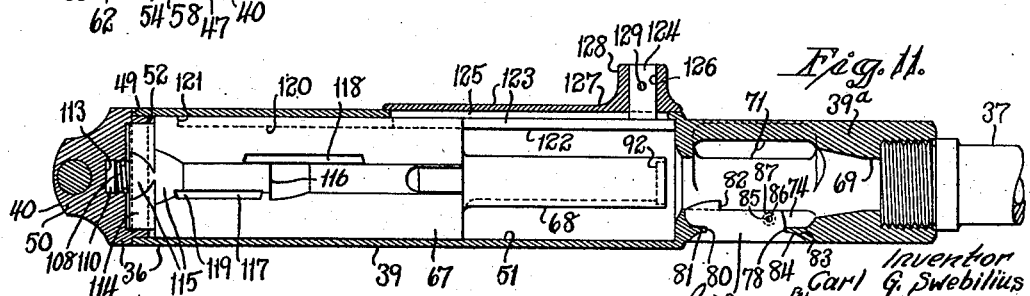

Feb. 29, 1944.    C. G. SWEBILIUS    2,342,824
SELF-LOADING REPEATING FIREARM
Filed Oct. 15, 1940    5 Sheets-Sheet 4
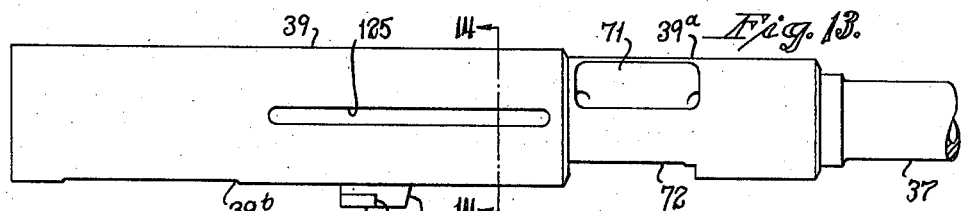
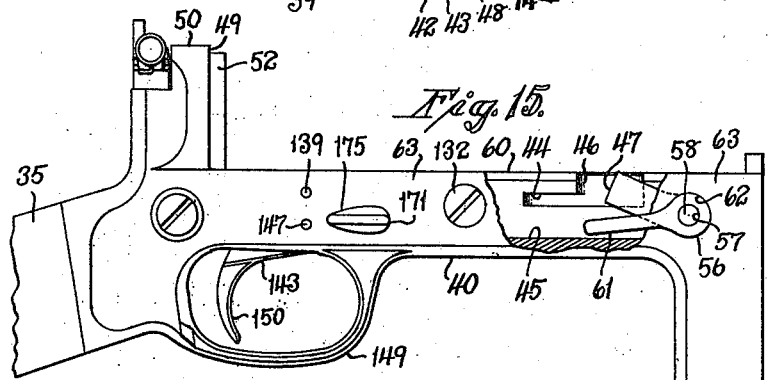
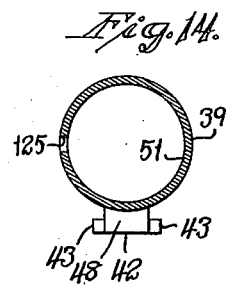
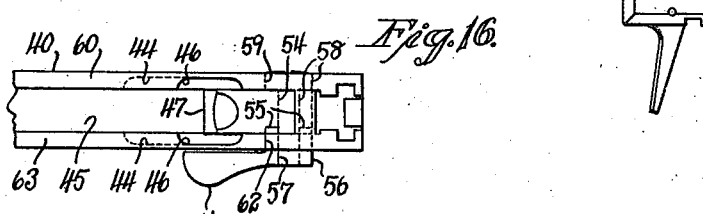
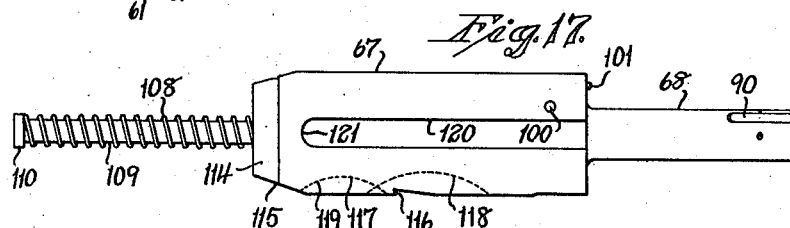
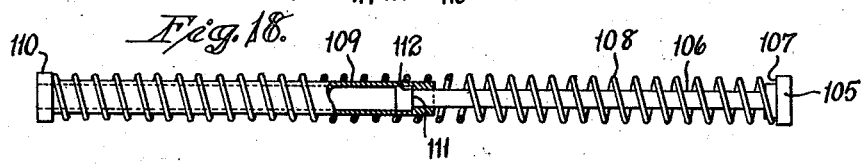
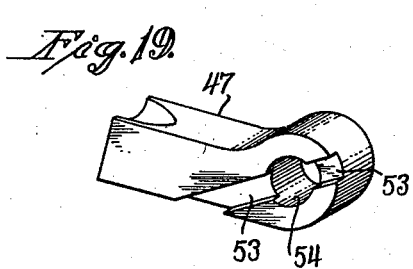
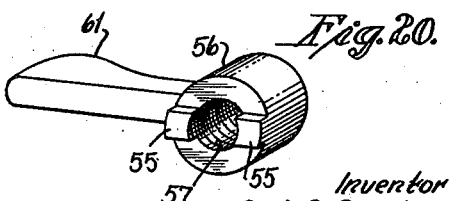
Inventor
by Carl G. Swebilius
Seymour Earle Nichols
Attorneys Feb. 29, 1944.                C. G. SWEBILIUS                2,342,824
                        SELF-LOADING REPEATING FIREARM
                           Filed Oct. 15, 1940        5 Sheets-Sheet 5
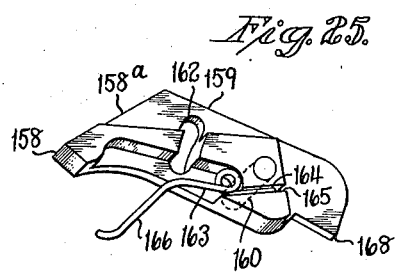
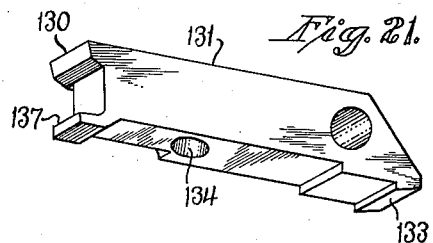
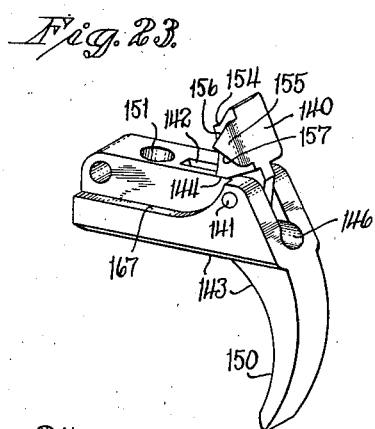
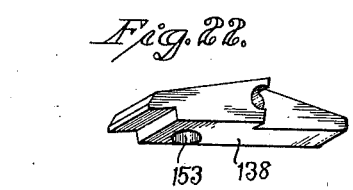
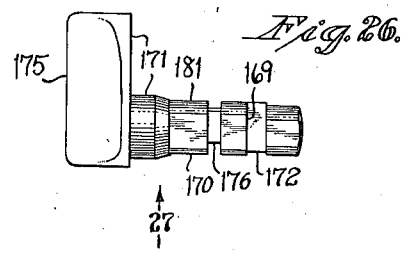
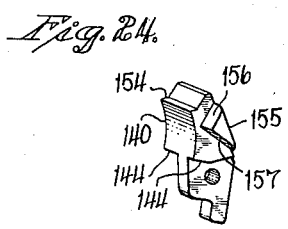
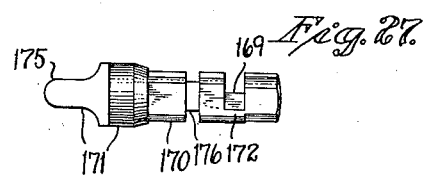
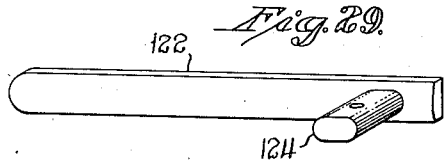
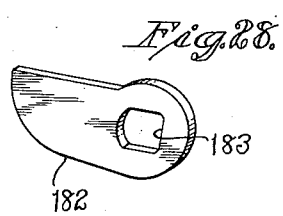
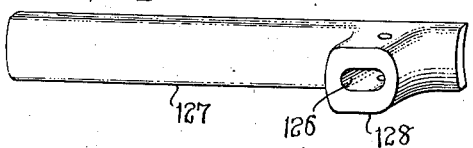
Inventor
by Carl G. Swebilius
Seymour Earle Nichols
Attorneys Patented Feb. 29, 1944

2,342,824

UNITED STATES PATENT OFFICE 2,342,824

SELF-LOADING REPEATING FIREARM

Carl G. Swebilius, Hamden, Conn., assignor, by mesne assignments, to The High Standard Manufacturing Corporation, New Haven, Conn., a corporation of Connecticut Application October 15, 1940, Serial No. 361,208

9 Claims. (Cl. 42—3)

The present invention relates to improvements in self-loading repeating firearms, that is to say, firearms of the type wherein the forces developed by the discharge of a given cartridge are utilized to operate the firearm and effect the extraction and ejection of the just-fired cartridge and the insertion of a fresh cartridge preparatory to another cycle of operation.

One of the objects of the present invention is to provide a superior self-loading repeating firearm characterized by fewness of parts and low cost for manufacture.

Another object of the present invention is to provide a superior firearm of the type referred to, and which is characterized by ruggedness and reliability of performance over long periods of time under adverse conditions.

A further object of the present invention is to provide a self-loading repeating firearm having a superior construction and arrangement of parts whereby danger to the marksman by reason of blow-backs and other misperformances of cartridges, will be substantially eliminated.

Still another object of the present invention is to provide a superior firearm of the type referred to, which is characterized by its capacity for selectively discharging once for each pull upon the trigger or continuously by merely holding the trigger back.

A further object is to provide a superior firearm of the character just above referred to wherein provision is made for effecting three distinct adjustments of the firearm by the manipulation of a single manual control-member whereby the firearm may be rendered safe, set for semi-automatic operation or full-automatic operation.

A still further object of the present invention is to provide a superior portable firearm of the so-called submachine gun type wherein provision is made for automatically restoring the safety-mechanism to a firing condition when the breech-bolt or its equivalent is manually drawn backward.

Still another object of the present invention is to provide a superior self-loading repeating firearm wherein the parts are organized together so that they may be readily taken down for convenience in transportation, but in which provision is made for securely coupling the parts when the same are assembled.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 1 is a view in a side elevation of a self-loading repeating firearm embodying the present invention;

Fig. 2 is a view of the central portion of the firearm shown mainly in vertical central-longitudinal section and partly in side elevation with the mechanism shown in cocked position preparatory to the discharge of the firearm, and with the mechanism set for effecting the so-called "semi-automatic" operation of the firearm;

Fig. 3 is a view corresponding to Fig. 2, but showing the parts in the positions which they assume at the instant of the discharge of the firearm;

Fig. 4 is a view generally corresponding to Figs. 2 and 3 though less comprehensive, and showing the parts in the positions which they assume when the breech-bolt is in its cocked position and the control-member has been turned into its so-called "safe" position;

Fig. 5 is a view corresponding to Fig. 4, but showing the parts in the positions which they assume when the breech-bolt is cocked and the mechanism is set for the so-called "full-automatic" operation of the firearm;

Fig. 6 is a broken transverse sectional view taken on the line 6—6 of Fig. 2, but on a larger scale;

Fig. 7 is a similar view taken on the line 7—7 of Fig. 2;

Fig. 8 is a broken transverse sectional view taken on the line 8—8 of Fig. 2, but on a larger scale;

Fig. 9 is a similar view taken on the line 9—9 of Fig. 2;

Fig. 10 is a broken transverse sectional view taken on the line 10—10 of Fig. 2;

Fig. 11 is a broken view in horizontal section taken on the line 11—11 of Fig. 2, but on a slightly reduced scale;

Fig. 12 is a perspective view of the ejector, detached;

Fig. 13 is a view in side elevation of the upper receiver-member together with the rear portion of the barrel assembled therewith;

Fig. 14 is a transverse sectional view taken on the line 14—14 of Fig. 13;

Fig. 15 is a view mainly in side elevation and partly in vertical section of the lower receiver-member together with a fragment of the buttstock;

Fig. 16 is a broken top or plan view of the forward portion of the lower receiver-member;

Fig. 17 is a view in side elevation of the breech-bolt together with the breech-closing-spring unit;

Fig. 18 is a view mainly in side elevation and partly in central-longitudinal section of the breech-closing-spring unit;

Fig. 19 is a perspective view of the pivotal latching-lever detached;

Fig. 20 is a similar view of the latch-releasing lever, detached;

Fig. 21 is a perspective view of the sear, detached;

Fig. 22 is a similar view of the sear-actuating lever, detached;

Fig. 23 is a perspective view of the trigger together with the sear-actuating dog carried thereby;

Fig. 24 is a perspective view of the sear-actuating dog, detached;

Fig. 25 is a perspective view of the unit comprising the selector-lever and its torsion-spring, detached;

Fig. 26 is an elevational view of the control-member, detached;

Fig. 27 is an elevational view of the control-member, viewing the same from the direction of the arrow 27 of Fig. 26;

Fig. 28 is a perspective view of the resetting-finger, detached;

Fig. 29 is a detached perspective view of the inner slide-member of the manual bolt-operating-slide unit; and Fig. 30 is a similar view of the outer slide-member of the manual bolt-operating-slide unit.

The particular self-loading repeating firearm herein chosen for purposes of illustrating the present invention is of the type wherein cartridges may be fired singly for each pull of the trigger or the mechanism may be set to sequentially discharge an entire magazine full of cartridges by holding the trigger in its pulled-back position. The said firearm comprises a buttstock 35, a two-part receiver generally designated by the reference character 36, a barrel 37 and a fore-end grip 38.

The receiver 36 above referred to includes an upper receiver-member 39 and a lower receiver-member 40 which are normally firmly and rigidly coupled together, but which as will hereinafter appear are readily separable one from the other. The said lower receiver-member is rigidly attached at its rear to the forward end of the buttstock 35 and is secured thereto by means of a bolt 41 shown in Fig. 1. The upper receiver-member 39 is generally of cylindrical form exteriorly and has threaded into its extreme forward end the rear end of the barrel 37 to which latter in turn is secured the fore-end grip 38. The upper receiver-member 39, the barrel 37 and the fore-end grip 38 constitute a unit demountable from and assemblable with the butt-unit which is composed, in the main, of the lower receiver-member 40 and the buttstock 35.

About midway of its length the upper receiver-member 39 is provided with a rigid depending coupling-lug 42 which at its rear portion is of inverted T-shaped form in cross-section as is especially well shown in Fig. 14, and has two oppositely-projecting coupling-ribs 43—43, the upper faces of which constitute upwardly-facing coupling-abutments. The coupling-ribs 43—43 are respectively adapted to enter coupling-grooves 44—44 formed in the respective opposite side-walls 60 and 63 of a longitudinally-extending and upwardly-opening mechanism-receiving chamber 45 in the lower receiver-member 40. The respective upper walls of the coupling-grooves 44—44 constitute downwardly-facing coupling-abutments.

As is shown particularly well in Figs. 15 and 16, each of the coupling-grooves 44—44 in the lower receiver-member 40 is connected at its front to the upper edge of the lower receiver-member 40 by means of one of two similar vertical clearance-passages 46—46 one of which is formed in each of the side-walls 60 and 63 and which are sufficiently wide in a direction lengthwise of the firearm structure to permit the ready entry of the coupling-ribs 43—43 of the upper receiver-member 39 for alignment with the respective forward ends of the coupling-grooves 44—44 therein.

For the purpose of releasably retaining the upper receiver-member 39 in assembled relationship with respect to the lower receiver-member 40, a latching-lever 47 is employed which is normally upwardly-and-rearwardly inclined. The rear face of the said latching-lever 47 has camming engagement with an inclined forwardly-facing locking-abutment 48 formed on the lug 42 depending from the upper receiver-member 39. The said latching-lever 47 acting through the locking-abutment 48 of the upper receiver-member 39 serves to maintain the coupling-ribs 43—43 in the coupling-grooves 44—44 and also to maintain the rear edge of the said receiver-member in seated engagement against an annular forwardly-facing seat 49. The said seat 49 is formed upon an integral portion 50 upwardly extending from the rear portion of the lower receiver-member 40.

The said upper receiver-member 39 is, generally speaking, of tubular form and is provided with a substantially-cylindrical interior mechanism-receiving chamber 51 in its rear portion which has a diameter substantially corresponding to the external diameter of a locating-ring 52. The said locating-ring 52 is formed integral with and forwardly projects from the portion 50 of the lower receiver-member 40 and extends a short distance forwardly into the interior of the mechanism-receiving chamber 51 in the upper receiver-member 39.

Returning now to the latching-lever 47, it will be noted that adjacent its forward end, the said lever is provided in one side face with two aligned coupling-grooves 53—53 (Fig. 19) extending diametrically of a transverse passage 54 of cylindrical form and located in the forward portion of the said latching-lever 47. The said latching-lever 47 is located in the forward portion of the mechanism-receiving chamber 45 in the lower receiver-member 40, and is of a width substantially corresponding to the width of the said chamber, as is especially well shown in Fig. 9. The coupling-grooves 53—53 in the latching-lever 47 respectively receive one of a pair of coupling-lugs 55—55 projecting inwardly from the inner face of a latch-releasing lever 56 (Fig. 20). The lugs 55—55 are located on the respective opposite sides of a threaded passage 57 formed in the lever 56 and adapted to register with the passage 54 in the latching-lever 47.

For the purpose of holding the latching-lever 47 and the latch-releasing lever 56 against axial lateral separation, a coupling-screw 58 (Fig. 9)

is employed which has its shank first extended through the passage 54 in the latching-lever 47 and then into threaded engagement with the threaded passage 57 in the latch-releasing lever 56. The head portion of the coupling-screw 58 bears in a cylindrically-contoured opening 59 in the side-wall 60 of the mechanism-receiving chamber 45 of the lower receiver-member 40. Save for.its offsetting finger-piece 61, the latch-releasing lever 56 is of cylindrical form and is mounted with capacity for turning movement in an opening 62 formed in the complemental sidewall 63 of the mechanism-receiving chamber 45 of the lower receiver-member 40.

About midway of its length the latching-lever 47 is formed with a downwardly-opening spring-pocket 64 receiving the upper end of a helical latch-spring 65 which acts to engage the rear end of the said latching-lever 47 with the latching-abutment 48 before referred to. The lower end of the latch-spring 65 is seated in an upwardly-opening spring-pocket 66 formed in the lower receiver-member 40 in the bottom of the mechanism-receiving chamber 45 therein.

Mounted in the mechanism-receiving chamber 51 of the upper receiver-member 39 is a cylindrically-contoured breech-bolt 67 which is provided with an integral coaxial and forwardly-projecting breech-closing stem 68. The said breech-closing stem 68 is cylindrically contoured and is adapted to be entered into and retired from a longitudinal passage 69 formed in the forward reduced diameter portion 39a of the upper receiver-member 39. At its rear end the passage 69 opens into the mechanism-receiving chamber 51 and at its forward end communicates with the rear end of a cartridge-chamber 70 formed in the rear end of the barrel 37 before referred to.. Leading upwardly and outwardly from the passage 69 which receives the breech-closing stem 68, is an ejection-opening 71, as is shown especially well in Figs. 1, 10, 11 and 13. Extending downwardly from the passage 69 is a vertical magazine-receiving passage 72 having at the opposite sides of its lateral center line two downwardly-facing longitudinally-extending shoulders 73 and 74.

Extending into the magazine-receiving passage 72 just above referred to, is the upper end of a box-magazine 75 which may be of any convenient or usual construction not requiring detailed description herein other than to state that it is adapted to force upwardly a column of cartridges such, for instance, as the cartridges 76 and 77. The wall of the receiver on the upper receiver-member 39 adjacent the shoulder 74 is provided with a horizontal longitudinally-extending slot 78 receiving a plate-like ejector 79 as is especially well shown in Figs. 10 and 11. Projecting forwardly into the slot 78 is a retaining-finger 80 (Fig. 11) fitting within a rearwardly-opening notch 81 formed in the rear end of the ejector 79. On its inner edge, the ejector 79 is formed with a forwardly-facing ejecting-abutment 82 which is adapted to be sequentially engaged by the individual cartridges as the same are moved rearwardly after being fired in the manner as will hereinafter appear. The forward outer corner of the ejector 79 is formed with a stop-finger 83 which is normally seated in a notch 84 forming a virtual continuation of the forward end of the slot 78 (Fig. 11). As thus constructed and arranged, the rear portion of the ejector 79 is stabilized against either outward or inward movement and the forward end thereof is stabilized against relative inward movement.

To releasably hold the forward portions of the ejector 79 against outward movement, the same is provided with a vertical latching-opening 85 receiving the latching-nose 86 (Fig. 10) formed at the lower end of a latching-plunger 87. The said latching-plunger 87 is mounted for reciprocation in the lower end of a downwardly-opening pocket 88 formed in the upper receiver-member 39 and opening through the face of the shoulder 74 thereof. The pocket 88 also accommodates a helical spring 89 which yieldingly urges the latching-plunger 87 downwardly to maintain its latching-nose 86 in the latching-opening 85 in the ejector 79.

To remove the ejector 79, the latching-nose 86 of the latching-plunger 87 may be retired by a sharp instrument inserted through the magazine-receiving passage 72, whereupon the said ejector may be maneuvered out of the slot 78 by first moving its forward end outwardly, so as to retire its stop-finger 83 from the notch 84.

For the purpose of extracting cartridges from the cartridge-chamber 70 of the barrel 37, the breech-closing stem 68 of the breech-bolt 67 is provided with an extractor 90 having at its forward end an inwardly-extending extracting-lip 91 extending radially into an annular recess 92 formed in the forward face of the said stem 68 and adapted to successively receive the head-ends of cartridges.

The forward portion of the breech-bolt 67 and its breech-closing stem 68 accommodates a reciprocating firing-plunger generally designated by the reference character 93 and having a relatively-slender forwardly-extending firing-point 94 adapted to be projected forwardly to engage with the primer of a cartridge when the same is substantially fully installed in the cartridge-chamber 70 of the barrel 37 in a manner as will presently appear. The firing-point 94 reciprocates in and is guided by an axial passage 95 which communicates at its rear end with a relatively-large-diametered passage 96 in which is accommodated the body-portion of the firing-plunger 93. The said passage 96 at its forward end also accommodates a helical retiring-spring 97 encircling the rear portion of the firing-point 94 and exerting a constant but yielding effort to move the entire firing-plunger 93 rearwardly.

For the purpose of moving the firing-plunger 93 forwardly to discharge a cartridge, a plate-like advancing-lever 98 is employed. The said advancing-lever 98 is mounted in a substantially-radial passage 99 leading from the axial passage 96 outwardly to the periphery of the breech-bolt 67 at a point immediately to the rear of the rear end of the breech-closing stem 68, as is especially well shown in Figs. 2 and 3. The advancing-lever 98 is mounted for pivotal movement upon a vertical and tangential pivot-pin 100 carried by the breech-bolt 67 and is provided with a forwardly-extending actuating-nose 101 extending through a groove 102 leading forwardly from the passage 99 to the front face of the breech-bolt 67 proper.

For the purpose of yieldingly urging the breech-bolt 67 forwardly into its breech-closing position shown in Fig. 3, the said breech-bolt is formed in its rear portion with an axial spring-receiving bore 103 opening through the rear end of the breech-bolt and at its forward end communicating with the smaller-diametered passage 96 in the forward portion of the breech-bolt. The difference in diameter between the bore 103 and the passage 96 results at the junction thereof in the formation of a rearwardly-facing seat 104 against which is seated the forward face of an internally-threaded plunger-head 105 threaded upon the forward end of a telescoping-plunger 106. The said plunger-head 105 is formed with a rearwardly-facing spring-seat 107 against which presses the forward end of a helical breech-closing spring 108 encircling a tubular telescoping-plunger 109, and hence also encircling the telescoping-plunger 106 which reciprocates within the said telescoping-plunger 109. The rear end of the breech-closing spring 108 is seated against the forward face of a head 110 formed integral with the rear end of the tubular telescoping-plunger 109 just referred to.

For the purpose of limiting the axial separation of the two telescoping-members 106 and 109, the said telescoping-member 106 is provided adjacent its rear end with an integral annular stop-abutment 111 which is adapted to engage a rearwardly-facing stop-abutment 112 formed within the tubular telescoping-member 109 adjacent the forward end thereof. The head 110 of the tubular telescoping-plunger 109 seats against the rear wall of a forwardly-opening pocket 113 formed centrally in the portion 50 at the rear upper part of the lower receiver-member 40, as is shown especially well in Figs. 2 and 3.

At its rear end the breech-bolt 67 is formed with an extension 114 which, in the main, is cylindrically contoured and has a diameter sufficient to freely fit within the interior of the locating-ring 52 of the lower receiver-member 40.

At its lower rear portion, the breech-bolt 67 is formed with a rearwardly-and-upwardly-sloping cam-surface 115 for purposes as will hereinafter appear. About midway of its length the breech-bolt 67 is formed in its under face with a forwardly-facing cocking-shoulder 116 and is also formed in its lower face with two clearance-grooves respectively numbered 117 and 118, each of which is both laterally and longitudinally displaced with respect to the other as is especially well shown in Fig. 11. The downwardly-and-rearwardly-sloping portion of the upper wall of the clearance-groove 117 constitutes a cam-surface 119 which functions in a manner as will hereinafter appear.

In its right side the breech-bolt 67 is formed with a longitudinally-extending groove 120 having its forward end intersecting the front end of the breech-bolt proper and having its rear end terminating just short of the rear end of the breech-bolt and constituting a forwardly-facing actuating-abutment 121. The groove 120 receives with capacity for relative longitudinal sliding movement the bar-like body-portion of an inner slide-member 122 of a manual bolt-operating slide generally designated by the reference character 123. At its forward end the inner slide-member 122 is provided with a rigid outwardly-projecting coupling-finger 124 projecting outwardly through a longitudinal slot 125 formed in the right side wall of the main portion of the upper receiver-member 39, as is particularly well shown in Figs. 9 and 11. The said coupling-finger 124 after passing outwardly through the slot 125 extends within a coupling-passage 126 extending perpendicularly through the forward portion of an outer slide-member 127. The said outer slide-member 127 is formed at its forward portion with an outwardly-projecting finger-piece 128 through which the coupling-passage 126 also extends and through which laterally extends a key-pin 129 also passing laterally through the coupling-finger 124 of the inner slide-member 122.

As thus constructed and arranged, the coupling-finger 124 and the key-pin 129 serve to organize the inner slide-member 122 and the outer slide-member 127 into a unitary structure which is capable of reciprocation with respect to the upper receiver-member 39 within substantially the limits of the length of the longitudinal slot 125 therein.

By virtue of the sliding fit of the inner slide-member 122 in the groove 120 in the side of the breech-bolt 67, the said breech-bolt is, in effect, held by the said inner slide-member 122 against rotational movement within the upper receiver-member 39. The inner slide-member 122 as well as the outer slide-member 127 is held against displacement around the periphery of the upper receiver-member 39 by the extension of the coupling-finger 124 through the slot 125 in the said member. Under these conditions it follows that the breech-bolt 67 is keyed or splined against rotational movement within the upper receiver-member 39 by the bolt-operating slide 123 while being permitted free longitudinal movement within the said receiver-member.

The cocking-shoulder 116 before referred to of the breech-bolt 67 is releasably engageable by the rear face of a cocking-nose 130 formed at the upper rear corner of a pivotal sear 131 located in the mechanism-receiving chamber 45 in the lower receiver-member 40. Adjacent its forward end the said sear 131 is mounted upon a pivot-pin 132 extending across the chamber 45 and supported at its respective opposite ends in the respective opposite side walls 60 and 63 of the said chamber. The sear 131 extends slightly forwardly and downwardly beyond the pivot-pin 132 to provide a stop-nose 133 engageable on occasion with the bottom wall of the mechanism-receiving chamber 45 to limit the clockwise turning movement of the said sear 131.

Substantially midway between the pivot-pin 132 and its rear end, the sear 131 is formed with a downwardly-opening spring-pocket 134 receiving the upper end of a helical sear-spring 135 having its lower end seated in an upwardly-opening pocket 136 formed in the bottom wall of the lower receiver-member 40. The said sear-spring 135 exerts a constant but yielding effort to move the cocking-nose 130 upwardly. At its lower rear portion and below its cocking-nose 130, the sear 131 is provided with a rearwardly-extending actuating-lip 137 with the upper face of which is engageable the forward portion of a pivotal sear-actuating lever 138. The said lever 138 is pivotally mounted about midway of its length upon a pivot-pin 139 supported at its respective opposite ends in the side walls 60 and 63 of the lower receiver-member 40. The said sear-actuating lever 138 is located rearwardly of the sear 131 and has its rear end extended into position for being lifted on occasion by a pivotal sear-actuating dog 140.

The sear-actuating dog 140 extends generally vertically and is pivoted intermediate its respective opposite ends upon a pivot-pin 141 extending transversely across a notch-like recess 142 formed in the upper rear portion of a trigger 143. The said pivot-pin 141 is carried by the said trigger 143 and is supported at its respective opposite ends in the side walls of the said recess 142. On each of its respective opposite sides the sear-actuating dog 140 is provided with one of two downwardly-facing stop-shoulders 144—144 which engage with the adjacent upper surface of the trigger 143 to thus limit the forward swinging movement of the upper end of the said dog. For the purpose of yieldingly urging the upper end of the sear-actuating dog 140 forwardly, the lower end thereof is engaged by the rear end of a substantially-horizontal dog-spring 145 mounted in a substantially-horizontal rearwardly-opening spring-pocket 146 in the trigger 143.

The trigger 143 is pivoted at its upper forward portion upon a pivot-pin 147 extending laterally across the mechanism-receiving chamber 45 in the lower receiver-member 40 and supported in the respective opposite side walls 60 and 63 thereof. The upper portion of the trigger 143 is located partly in the mechanism-receiving chamber just referred to, and partly within a vertical clearance-passage 148 extending downwardly from the chamber 45 through the bottom wall of the lower receiver-member 40 and into the space surrounded by a loop-like trigger-guard 149 formed integral with the lower receiver-member 40. The said trigger 143 is provided with a usual finger-piece 150 extending within the space circumscribed by the trigger-guard 149 and movable backwardly and forwardly therein in the usual manner of triggers.

In its upper face adjacent its forward end but rearwardly of the pivot-pin 147, the trigger 143 is formed with an upwardly-opening spring-pocket 151. The spring-pocket 151 just referred to receives the lower end of a helical spring 152 having its upper end seated in a downwardly-opening spring-pocket 153 formed in the sear-actuating lever 138 at a point rearwardly of the pivot-pin 139 thereof.

The spring 152 above referred to discharges the double function of lightly urging the sear-actuating lever 138 to turn in a clockwise direction, and similarly urging the trigger 143 to turn in a counterclockwise direction as is required to maintain the finger-piece 150 of the said trigger in its forward position. The said spring 152 by yieldingly urging the sear-actuating lever 138 to turn in a clockwise direction maintains the forward end of the said lever in engagement with the upper surface of the actuating-lip 137 of the sear 131 and avoids lost motion between the said parts. It is to be here noted, however, that the tension of the spring 152 just referred to, is sufficiently less than the tension of the more rugged sear-spring 135 as to be dominated by the latter. In other words, while the spring 152 normally exerts an effort to depress the rear end of the sear 131, nevertheless the sear-spring 135 is of sufficient strength to overcome and prevent such turning under the urge of the said spring 152.

Returning now to the sear-actuating dog 140, it will be noted that the said dog is provided at its upper end with an upwardly-facing lifting-abutment 154 which is engageable with the under face of the rear portion of the sear-actuating lever 138 for the purpose of turning the same in a clockwise direction, under conditions as will hereinafter appear. The said sear-actuating dog is formed on its left side with a laterally-extending lug 155 (Fig. 24) providing an upwardly-and-rearwardly-sloping cam-surface 156 and a downwardly-and-rearwardly-sloping retaining-surface 157.

Both the cam-surface 156 and the retaining-surface 157 of the sear-actuating dog 140 are adapted to be engaged by the tapered nose 158 formed at the rear end of a pivotal selector-lever 159 which also has a rearwardly-and-downwardly-sloping cam-surface 158a. The said selector-lever 159 is mainly located in the mechanism-receiving chamber 45 of the lower receiver-member 40 adjacent the side wall 60 and, therefore, to one side though in overlapping relationship with respect to both the sear-actuating lever 138 and the sear 131. The said selector-lever 159 like the sear 131 is adapted to extend upwardly through a clearance-opening 39b in the bottom of the upper receiver-member 39 and is mounted intermediate its ends for pivotal movement upon a stud 160. The inner end of the said stud extends into and is rigidly attached to the selector-lever and projects laterally therefrom to the left into a suitable bearing-aperture 161 in the left side wall 60 of the lower receiver-member 40, as is shown particularly well in Fig. 6. To permit limited swinging movement, the selector-lever 159 is formed about midway between the stud 160 and its nose 158 with an arcuate clearance-slot 162 through which the pivot-pin 139 of the sear-actuating lever 138 extends.

For the purpose of yieldingly urging the selector-lever 159 to turn in a clockwise direction, a torsion-spring 163 is employed having the shorter of its two arms 164 forwardly extending and jammed into a groove or recess 165 formed in the side wall of the selector-lever 159, as is shown especially well in Fig. 25. The longer arm 166 of the torsion-spring 163 extends rearwardly and downwardly and has its curved terminal portion normally resting upon an upwardly-facing ledge 167 formed upon the trigger 143.

The nose 158 at the rear end of the selector-lever 159 is adapted to engage with the cam-surface 156 of the sear-actuating dog 140 to rock the upper end of the said dog rearwardly on occasion, as will hereinafter appear, and the said nose 158 is also adapted to engage with the retaining-surface 157 of the said dog to be retained thereby in a depressed position.

Extending forwardly from its stud 160 the selector-lever 159 is provided with a control-arm 168, the lower portion of which is under some conditions accommodated in a clearance-notch 169 formed in the shank 170 of a manually-operable control-member generally designated by the reference character 171. The clearance-notch 169 in the shank 170 results in the formation in the said shank of an eccentric portion 172 which is adapted to engage with the under face of the control-arm 168 of the selector-lever 159 for purposes as will hereinafter appear. The shank 170 of the control-member 171 is mounted for turning movement in complemental transverse bearing-passages (Fig. 6) 173 and 174 respectively formed in the side walls 60 and 63 of the lower receiver-member 40. Formed integral with and laterally offsetting from the shank 170 of the control-member 171 is a finger-piece 175 extending alongside the outer face of the side wall 63 of the receiver-member 40 in convenient position for manual manipulation.

About midway of its length the shank 170 of the control-member 171 is provided with an annular retaining-groove 176 receiving the upwardly-projecting retaining-nose 177 of an inverted cup-shaped retaining-plunger 178 mounted beneath the said shank 170 in an upwardly-opening pocket 179 formed in the bottom wall of the mechanism-receiving chamber 45 of the lower receiver-member 40, as is especially well shown in Fig. 6. The said retaining-plunger 178 is urged upwardly by a helical spring 180 located in the said pocket 179 and extending upwardly into the cavity within the lower portion of the inverted cup-shaped plunger 178.

The shank 170 of the control-member 171 is flattened on three of its sides and the remaining fourth side is left convex as shown, to provide a sear-supporting safety-surface 181 which acts to prevent the downward swinging movement of the rear portion of the sear 131 when the control-member is swung into the position in which it is shown in Fig. 4.

By virtue of its three flat faces, the major portion of the shank 170 of the control-member 171 is of non-circular form in cross-section and the portion thereof adjacent the finger-piece 175 has mounted thereon a resetting-finger 182 having a non-circular perforation 183 corresponding in form to the cross-sectional form of the adjacent portion of the shank 170. The resetting-finger 182 is accommodated mainly in the mechanism-receiving chamber 45 of the lower receiver-member 40 between the inner face of the side wall 63 thereof and the adjacent face of the sear 131, as is especially well shown in Fig. 6. When the control-member 171 is turned into its intermediate or safety position when the breech-bolt 67 is cocked, the upper portion of the said resetting-finger projects upwardly through the clearance-opening 39b and is accommodated in the clearance-groove 118 in the said breech-bolt, as is shown in Fig. 4.

*"Semi-automatic" setting of the firearm mechanism*

For the purpose of making clear the operation of the self-loading repeating firearm herein chosen for purposes of illustrating the present invention, let it be assumed that the parts are in the positions in which they are indicated in Fig. 2. Under the conditions just referred to, the breech-bolt 67 is held in its cocked or retired position by the sear 131 and the control-member 171 is turned to the limit of its counterclockwise movement, in which position the mechanism is set for semi-automatic operation of the fierarm, that is to say, while the cartridges will be automatically extracted and ejected and a fresh cartridge inserted into the cartridge-chamber 70, that nevertheless the discharge of each sequential cartridge inserted into the said cartridge-chamber 70 will require a separate and distinct pull of the trigger 143.

Let it now be assumed that the finger-piece 150 of the trigger 143 is pulled rearwardly. The described rearward movement of the finger-piece 150 will cause the clockwise swinging movement of the trigger 143 and hence result in causing the sear-actuating dog 140 to bodily rise with the rear portion of the said trigger with the result that its upwardly-facing lifting-abutment 154 will be brought into lifting engagement with the under face of the rear end of the sear-actuating lever 138 so that the said lever will also be turned in a clockwise direction about its pivot-pin 139.

The clockwise turning movement of the sear-actuating lever 138 as just above described will cause the under face of the forward end thereof to press downwardly upon the upper surface of the actuating-lip 137 of the sear 131 with the result that the rear portion of the said sear 131 will be depressed against the tension of the sear-spring 135 sufficiently to disengage its cocking-nose 130 from the cocking-shoulder 116 of the breech-bolt 67, thus releasing the said breech-bolt for forward movement.

The release of the breech-bolt 67 as above described will enable the breech-closing spring 108 to assert itself and move the said breech-bolt forwardly toward the position in which it is shown in Fig. 3. Shortly after the initiation of the forward movement of the breech-bolt 67, the cam-surface 119 in the clearance-groove 117 in the said breech-bolt will engage with the cam-surface 158a of the selector-lever 159 with the result that the rear portion of the said selector-lever will be depressed against the tension of the torsion-spring 163, thereby causing the nose 158 of the said selector-lever to engage with the cam-surface 156 of the sear-actuating dog 140. The engagement just referred to will cause the upper portion of the said sear-actuating dog to swing rearwardly against the tension of the dog-spring 145, thereby moving the lifting-abutment 154 out from under the rear end of the sear-actuating lever 138. In its downward swinging movement, the nose 158, after swinging the upper portion of the sear-actuating dog rearwardly as described, passes beneath the cam-surface 156 of the said dog and engages with the reversely-sloping retaining-surface 157 thereof, whereby the said selector-lever 159 is temporarily restrained in the position which it has just assumed.

As soon as the upper portion of the sear-actuating dog 140 has been swung rearwardly as above described, so that the lifting-abutment 154 thereof is moved out from beneath the rear end of the sear-actuating lever 138, the said sear-actuating lever will be free to turn in a counter-clockwise direction and the rear end of the sear 131 will be free to rise, both under the urge of the sear-spring 135 and against the tension of the spring 152. It will be understood that following the initial pull of the trigger 143, the said trigger will be in its "pulled" position during the operations just described since the time-interval here involved is substantially too short a time for the said trigger to be released by the user, even should that release be desired.

Immediately following its release by the sear 131, the breech-bolt 67 in moving forwardly will cause the forward face of its breech-closing stem 68 to engage with the rear face of the cartridge 77 which is uppermost in the box-magazine 75 and push the same forwardly and upwardly along an inclined path into the cartridge-chamber 70 of the barrel 37. During the latter part of the movement of the cartridge 77 as described, its head-end will come into registration with and will be entered into the recess 92 in the forward face of the stem 68 of the breech-bolt 67, as indicated in Fig. 3.

As the breech-bolt 67 approaches almost to its full breech-closing position, the actuating-nose 101 of the advancing-lever 98 will engage with the abutment 39c in the upper receiver-member 30 and will be thereby swung in a counter-clockwise direction about its pivot-pin 100. The swinging movement of the advancing-lever 98 as just described, will cause the lower end thereof to positively drive the firing-plunger 93 forwardly to cause its firing-point 94 to discharge the cartridge 77 substantially coincidentally with the arrival of the latter into its fully-inserted position in the cartridge-chamber 70 of the barrel 37.

The parts will now have momentarily assumed the positions in which they are shown in Fig. 3.

Immediately following the discharge of the cartridge 77 as above described, the breech-bolt 67 and the parts carried thereby will be caused to recoil very rapidly with the effect of causing the extractor 90 to withdraw the casing of the just-fired cartridge 77 from the cartridge-chamber 70 and engage the same with the ejecting-abutment 82 of the ejector 79 and thereby cause the said case to be flipped outwardly and upwardly through the ejection-opening 71 in the forward portion 39a of the upper receiver-member 39. The rearward movement of the breech-bolt 67 as just described will be effected against the counter-urge of the breech-closing spring 108 and as soon as the said rearward movement has been initiated, the actuating-nose 101 of the advancing-lever 98 will ride clear of the abutment 39c and thereby permit the retiring-spring 97 to rearwardly retire the firing-plunger 93 relative to the breech-bolt.

The recoil forces above referred to will ultimately drive the breech-bolt 67 into its fully-retired position, which position is substantially represented in Fig. 2. During the said movement, the cam-surface 115 at the lower rear corner of the said breech-bolt will cam the rear portion of the sear 131 downwardly. As soon, however, as the cocking-shoulder 116 of the breech-bolt has reached a position slightly to the rear of the rear face of the cocking-nose 130 of the said sear, the said cocking-nose will snap upwardly under the urge of the sear-spring 135 and again be in a position to releasably hold the breech-bolt and the parts carried thereby in their cocked positions, as illustrated in Fig. 2. As the substantially cylindrical extension 114 of the breech-bolt 67 enters the interior of the locating-ring 52, air will be partially trapped within the said ring and thereby aid in cushioning and ultimately halting the rearward travel of the said breech-bolt.

The next normal step in the operation of the firearm would be for the marksman to release rearward draft upon the finger-piece 150 of the trigger 143, since only in this manner can the firearm again be discharged when the control-member 171 is in the position indicated in Figs. 2 and 3.

As soon now as rearward draft upon the trigger 143 is released, the helical spring 152 will act to swing the entire trigger in a counterclockwise direction and thereby bodily lower the sear-actuating dog 140 with the effect of first releasing the frictional engagement between the upper surface of the nose 158 of the selector-lever 159 and the retaining-surface 157 of the said dog. The torsion-spring 163 will now act to swing the selector-lever 159 in a clockwise direction until the said selector-lever reassumes the position in which it is shown in Fig. 2. The bodily lowering of the sear-actuating dog 140 will also bring its lifting-abutment 154 to a point beneath the under-face of the rear portion of the sear-actuating lever 138 whereupon the upper end of the said dog will swing forwardly under the urge of the helical dog-spring 145 to again reassume the position in which it is shown in Fig. 2, preparatory to again acting to discharge the firearm when the trigger 143 is again pulled.

"Safety" setting of the firearm mechanism

To render the firearm inoperative and thus prevent its being fired, the control-member 171 may be swung into the position in which it is represented by the broken lines B in Fig. 1 and the full-line position shown in Fig. 4.

When the control-member 171 is in the position just above referred to, the sear-supporting safety-surface 181 of the said control-member will be moved beneath the adjacent portion of the sear 131, to thereby positively prevent the rear portion of the said sear from being moved downwardly to release the breech-bolt 67 from its cocked position. The turning of the control-member 171 into its safety position as just referred to will also cause the eccentric portion 172 thereof to rock the selector-lever 159 in a counterclockwise direction, though this movement of the selector-member is purely incidental and may, therefore, be ignored. When the control-member is swung into its safety position, the resetting-finger 182 coupled thereto will be brought into an upright position, as is clearly shown in Fig. 4, with the upper portion of the said resetting-finger projected into the clearance-groove 118 in the under surface of the breech-bolt 67.

Normally, the control-member should be thrown into its safety position only when the breech-bolt is in its cocked position, but in the event that if for any reason the control-member 171 should be thrown into its safety position when the breech-bolt is in its forward or breech-closing position, no harm will be done. When, however, it is desired to render the firearm again available for being discharged after the setting as just described, it is necessary for the marksman to first draw rearwardly upon the finger-piece 128 of the bolt-operating slide 123, to thereby cause the rear end of the inner slide-member 122 to engage with the actuating-abutment 121 in the breech-bolt 67. The continued rearward movement of the bolt-operating slide 123 will move the breech-bolt 67 rearwardly into its cocked position and during this movement, the cam-surface 115 on the lower rear portion of the said breech-bolt will engage with the resetting-finger 182 of the control-member 171. The engagement just referred to will swing the resetting-finger 182 and the control-member 171 in a counterclockwise direction and automatically restore the said parts to the positions which they occupy in Figs. 2 and 3, wherein the firearm is set for so-called "semi-automatic" operation.

The automatic turning of the control-member 171 as just above described automatically avoids the jamming of the parts as might otherwise be the case, since were the said control-member to be left in its safe position while the breech-bolt was moved rearwardly, the cam-surface 115 of the breech-bolt 67 would jam the rear portion of the sear downwardly against the safety surface 181 of the said control-member.

"Full automatic" setting of the firearm mechanism

For the purpose of enabling the continuous discharge of the entire contents of the box-magazine 75 as the result of but a single pull of the trigger 143 and the holding of the said trigger in its pulled position, the control-member 171 should be swung into the position in which it is indicated by the broken line C in Fig. 1 and by full lines in Fig. 5.

When the control-member 171 is swung as above described, the eccentric portion 172 thereof will act upon the under face of the control-arm 168 of the selector-lever 159, to swing the said selector-lever in a counterclockwise direction against the tension of the torsion-spring 163, and will maintain the said selector-lever in its counterclockwise turned position.

The counterclockwise turning movement of the selector-lever 159 will cause the nose 158 thereof to cam its way past the lug 155 of the sear-actuating dog 140 and assume a position in which the said nose 158 in no way interferes with the movements of the said dog.

If now the trigger 143 is pulled, the lifting-abutment 154 of the sear-actuating dog 140 will be caused to engage with the under face of the rear portion of the sear-actuating lever 138 to cause the said lever to swing in a clockwise direction and thereby depress the rear end of the sear 131 and thus effect the discharge of the firearm. If, as is intended, rearward draft is maintained upon the trigger 143, the cocking-nose 130 of the sear 131 will be maintained in its depressed or inoperative position and when the breech-bolt 67 recoils as a result of the discharge of a cartridge, it will not be caught by the now-depressed sear 131 and will be free to again return to its breech-closing position to thereby insert and fire a fresh cartridge and to again repeat the cycle until the cartridges in the magazine 75 have been exhausted, or until rearward draft upon the trigger is relaxed.

The control-member 171 will be yieldingly retained in either one of its three positions above described by the engagement of the upper face of the retaining-nose 177 of the retaining-plunger 178 respectively with a given one of the three flat surfaces at the bottom of the retaining-groove 176 in the shank 170 of the said control-member 171.

*The takedown of the firearm*

To remove the upper receiver-member 39 and the parts carried thereby from the lower receiver-member 40 and the parts carried thereby, the finger-piece 61 of the latch-releasing lever 56 should be depressed to thereby correspondingly depress the rear end of the latching-lever 47 and thus disengage the latter from the latching-abutment 48 of the coupling-lug 42 of the upper receiver-member 39.

When the latching-lever 47 is depressed as above described, the upper receiver-member 39 may be moved forwardly relative to the lower receiver-member 40 until its rear portion is free of the locating-ring 52 and the coupling-ribs 43—43 are forwardly retired from out of the coupling-grooves 44—44 and are brought into registry with the vertical clearance-passages 46—46. The upper receiver-member 39, together with the parts carried thereby (including the breech-bolt 67); may now be lifted clear of the lower receiver-member 40 and completely removed therefrom.

To reassemble the firearm, the operations above described may be reversed.

When the firearm is taken down as above described, the breech-bolt 67 and the parts carried thereby may be very readily removed from the rear end of the upper receiver-member 39, together with the parts carried by the said breech-bolt. The breech-closing spring 108 may be, in turn, removed from the breech-bolt 67 together with the two telescoping-members 106 and 109 as a unit shown in Fig. 18. The telescoping-plungers 106 and 109 permit all of the axial expansion and contraction of the breech-closing spring 108 required for the operation of the firearm, but the said telescoping-plungers act to limit the axial expansion of the said spring 108 when the firearm is taken down. The limiting action just referred to serves to facilitate the reassembly of the firearm-units without requiring extremely careful and difficult manipulation of the breech-closing spring 108 or its equivalent.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A self-loading repeating firearm including in combination: a receiver; a breech-bolt reciprocatable in said receiver; a sear for releasably holding the said breech-bolt in its retired position; a trigger; a sear-actuating dog carried by the said trigger and movable relative thereto and bodily movable therewith; the said sear-actuating dog having a substantially-downwardly facing retaining-surface thereon; a sear-actuating lever operatively interposed between the said sear and the said sear-actuating dog to transmit the movement of the latter to the said sear to effect the retirement thereof; a selector-lever engageable with the said sear-actuating dog to retire the same out of operative relationship with the said sear-actuating lever, the said selector-lever being positioned for actuation by a portion of the said breech-bolt to automatically effect the retirement of the said sear-actuating dog as a result of the movement of the said breech-bolt, the said selector-lever also having a substantially-upwardly-facing retaining-surface releasably engageable with the downwardly-facing retaining-surface of the said sear-actuating dog; and spring-means yieldingly moving the said selector-lever in a direction to engage the retaining-surface thereof with the retaining-surface of the said sear-actuating dog.

2. A self-loading repeating firearm including in combination: a receiver; a breech-bolt reciprocable in the said receiver; a sear for releasably holding the said breech-bolt in its retired position; a sear-actuating lever operatively associated with the said sear to retire the same; a trigger; a sear-actuating dog carried by the said trigger and pivoted thereto for swinging movement into and out of position to engage a portion of the said sear-actuating lever; the said sear-actuating dog having a substantally-downwardly-facing retaining surface thereon; a selector-lever engageable with the said sear-actuating dog to swing the same into its retired position relative to the said sear-actuating lever, the said selector-lever being positioned for actuation by a portion of the said breech-bolt to automatically effect the swinging of the said sear-actuating dog into its retired position as a result of the movement of the said breech-bolt, the said selector-lever also having a substantially-upwardly-facing retaining-surface releasably engageable with the downwardly-facing retaining-surface of the said sear-actuating dog; and spring-means yieldingly moving the said selector-lever in a direction to engage the retaining-surface thereof with the retaining-surface of the said sear-actuating dog.

3. A self-loading repeating firearm including in combination: a receiver; a breech-bolt reciprocatable in the said receiver; a sear for releasably holding the said breech-bolt in its retired position; a sear-actuating lever operatively associated with the said sear to retire the same; a trigger; a sear-actuating dog carried by the said trigger and pivoted thereto for swinging movement into and out of position to engage a portion of the said sear-actuating lever; the said sear-actuating dog having a substantially-downwardly-face retaining-surface thereon; a selector-lever engageable with the said sear-actuating dog to swing the same into its retired position relative to the said sear-actuating lever, the said selector-lever being positioned for actuation by a portion of the said breech-bolt to automatically effect the swinging of the said sear-actuating dog into its retired position as a result of the movement of the said breech-bolt; the said selector-lever also having a substantially-upwardly-facing retaining-surface releasably engageable with the downwardly-facing retaining-surface of the said sear-actuating dog; spring-means yieldingly moving the said selector-lever in a direction to engage the retaining-surface thereof with the retaining-surface of the said sear-actuating dog and spring-means carried by the said trigger and yieldingly urging the said sear-actuating dog into position for engagement with the said sear-actuating lever.

4. A self-loading repeating firearm including in combination: a receiver; a breech-bolt reciprocatable in said receiver; a sear for releasably holding the said breech-bolt in its retired position; a trigger; a sear-actuating dog carried by the said trigger and movable relative thereto and bodily movable therewith; the said sear-actuating dog having a substantially downwardly-facing retaining-surface thereon, a sear-actuating lever operatively interposed between the said sear and the said sear-actuating dog to transmit the movement of the latter to the said sear to effect the retirement thereof; a selector-lever engageable with the said sear-actuating dog to retire the same out of operative relationship with the said sear-actuating lever, the said selector-lever being positioned for actuation by a portion of the said breech-bolt to automatically effect the retirement of the said sear-actuating dog as a result of the movement of the said breech-bolt; the said selector-lever also having a substantially-upwardly-facing retaining-surface releasably engageable with the downwardly-facing retaining-surface of the said sear-actuating dog; spring-means yieldingly moving the said selector-lever in a direction to engage the retaining-surface thereof with the retaining-surface of the said sear-actuating dog and a manually-operable control-member engageable with the said selector-lever to rock the same into a retired position wherein the said selector-lever is out of operative relationship with respect to the said sear-actuating dog.

5. A self-loading repeating firearm including in combination: a receiver; a breach-bolt reciprocatable in the said receiver; a sear for releasably holding the said breech-bolt in its retired position; a sear-actuating lever operatively associated with the said sear to retire the same; a trigger; a sear-actuating dog carried by the said trigger and pivoted thereto for swinging movement into and out of position to engage a portion of the said sear-actuating lever; the said sear-actuating dog having a substantially-downwardly-facing retaining surface thereon, a selector-lever engageable with the said sear-actuating dog to swing the same into its retired position relative to the said sear-actuating lever, the said selector-lever being positioned for actuation by a portion of the said breech-bolt to automatically effect the swinging of the said sear-actuating dog into its retired position as a result of the movement of the said breech-bolt; the said selector-lever also having a substantially-upwardly-facing retaining-surface releasably engageable with the downwardly-facing retaining-surface of the said sear-actuating dog; spring-means yieldingly moving the said selector-lever in a direction to engage the retaining-surface thereof with the retaining-surface of the said sear-actuating dog and a manually-operable control-member engageable with the said selector-lever to rock the same into a retired position wherein the said selector-lever is out of operative relationship with respect to the said pivotal sear-actuating dog.

6. A self-loading repeating firearm including in combination: a receiver; a breech-bolt reciprocatable in said receiver; a sear for releasably holding the said breech-bolt in its retired position; a trigger; a sear-actuating dog carried by the said trigger and movable relative thereto and bodily movable therewith; the said sear-actuating dog having a substantially-downwardly-facing retaining surface thereon, a sear-actuating lever operatively interposed between the said sear and the said sear-actuating dog to transmit the movement of the latter to the said sear to effect the retirement thereof; a selector-lever engageable with the said sear-actuating dog to move the same into its retired position relative to the said sear-actuating lever, the said selector-lever being positioned for actuation by a portion of the said breech-bolt to automatically effect the retirement of the sear-actuating dog, the said selector-lever also having a substantially-upwardly-facing retaining-surface releasably engageable with the downwardly-facing retaining-surface of the said sear-actuating dog; spring-means yieldingly moving the said selector-lever in a direction to engage the retaining-surface thereof with the retaining-surface of the said sear-actuating dog; spring-means carried by the said trigger and yieldingly urging the said sear-actuating dog into position for engagement with the said sear-actuating lever; and a manually-operable control-member engageable with the said selector-lever to rock the same into a retired position wherein the said selector-lever is out of operative relationship with respect to the said sear-actuating dog.

7. A self-loading repeating firearm including in combination: a receiver; a breech-bolt reciprocatable in the said receiver; a sear for releasably holding the said breech-bolt in its retired position; a sear-actuating lever operatively associated with the said sear to retire the same; a trigger; a sear-actuating dog carried by the said trigger and pivoted thereto for swinging movement into and out of position to engage a portion of the said sear-actuating lever, the said sear-actuating dog having a substantially downwardly-facing retaining surface thereon; a selector-lever engageable with the said sear-actuating dog to swing the same into its retired position relative to the said sear-actuating lever, the said selector-lever being positioned for actuation by a portion of the said breech-bolt to automatically effect the swinging of the said sear-actuating dog into its retired position as a result of the movement of the said breech-bolt; the said selector-lever also having a substantially-upwardly-facing retaining-surface releasably engageable with the downwardly-facing retaining-surface of the said sear-actuating dog; spring-means yieldingly moving the said selector-lever in a direction to engage the retaining-surface thereof with the retaining-surface of the said sear-actuating dog; spring-means carried by the said trigger and yieldingly urging the said sear-actuating dog into position for engagement with the said sear-actuating lever; and a manually-operable control-member engageable with the said selector-lever to rock the same into a retired position wherein the said selector-lever is out of operative engagement with the said sear-actuating dog.

8. A self-loading repeating firearm including in combination: a receiver; a breech-bolt reciprocatable in said receiver; a sear for releasably holding the said breech-bolt in its retired position; a trigger; a sear-actuating dog carried by the said trigger and movable relative thereto and bodily movable therewith; a sear-actuating lever operatively interposed between the said sear and the said sear-actuating dog to transmit the movement of the latter to the said sear to effect the retirement thereof; a selector-lever engageable with the said sear-actuating dog to retire the same out of operative relationship with the said sear-actuating lever, the said selector-lever being positioned for actuation by a portion of the said breech-bolt to automatically effect the retirement of the said sear-actuating dog as a result of the movement of the said breech-bolt; and a manually-operable control-member having means operatively acting on the said sear to prevent the movement of the same into its breech-bolt-releasing position, the said control-member also having means engageable with the said selector-lever to swing the same into a retired position when the said control-member is swung into a position of non-interference with the said sear, and the said control-member being constructed and arranged to be swung into a third position wherein it is retired out of controlling relationship with respect to both the said sear and the said selector-lever.

9. A self-loading repeating firearm including in combination: a receiver; a breech-bolt reciprocatable in said receiver; a sear for releasably holding the said breech-bolt in its retired position; a trigger; a sear-actuating dog carried by the said trigger and movable relative thereto and bodily movable therewith; a sear-actuating lever operatively interposed between the said sear and the said sear-actuating dog to transmit the movement of the latter to the said sear to effect the retirement thereof; a selector-lever engageable with the said sear-actuating dog to retire the same out of operative relationship with the said sear-actuating lever, the said selector-lever being positioned for actuation by a portion of the said breech-bolt to automatically effect the retirement of the said sear-actuating dog as a result of the movement of the said breech-bolt; a manually-operable control-member having means operatively acting on the said sear to prevent the movement of the same into its breech-bolt-releasing position, the said control-member also having means engageable with the said selector-lever to swing the same into a retired position when the said control-member is swung into a position of non-interference with the said sear, and the said control-member being constructed and arranged to be swung into a third position wherein it is retired out of controlling relationship with respect to both the said sear and the said selector-lever; and means carried by the said control-member and extending into position for engagement by a portion of the said breech-bolt when the same is retired to automatically shift the said control-member into position to release the said selector-lever of restraint.

CARL G. SWEBILIUS.